(12) United States Patent
Washburn

(10) Patent No.: US 6,374,536 B1
(45) Date of Patent: Apr. 23, 2002

(54) SUBTERRANEAN TERMITE MONITOR AND METHOD

(75) Inventor: Lawrence Washburn, 18331 S. Highway 421, P.O. Box 621, Hyden, KY (US) 41749

(73) Assignees: Lawrence Washburn, Hyden, KY (US); Carl McFarland, Cincinnati, OH (US)

( * ) Notice: Subject to any disclaimer, the term of this patent is extended or adjusted under 35 U.S.C. 154(b) by 30 days.

(21) Appl. No.: 09/604,369

(22) Filed: Jun. 27, 2000

(51) Int. Cl.[7] .............................. A01M 1/00; A01M 1/20
(52) U.S. Cl. ........................................ 43/132.1; 43/131
(58) Field of Search .................... 43/107, 124, 131, 43/132.1

(56) References Cited

U.S. PATENT DOCUMENTS

| | | | | |
|---|---|---|---|---|
| 454,117 A | * | 6/1891 | Myers | 43/124 |
| 1,013,514 A | | 1/1912 | Rand | 43/131 |
| 2,004,123 A | * | 6/1935 | Loibl | 43/131 |
| 2,045,018 A | * | 6/1936 | Loibl, Jr. | 43/131 |
| 2,086,046 A | | 7/1937 | Preston | 43/124 |
| 2,180,199 A | * | 11/1939 | Loibl, Jr. | 43/131 |
| 2,224,485 A | | 12/1940 | Pekkala | 43/121 |
| 3,151,746 A | | 10/1964 | Reustle et al. | 43/124 |
| 3,564,750 A | | 2/1971 | Burgess | 43/107 |
| 3,624,953 A | | 12/1971 | Crosby | 43/131 |
| 3,835,578 A | | 9/1974 | Basile | 43/132.1 |
| 3,909,975 A | | 10/1975 | Basile | 43/124 |
| 3,940,875 A | | 3/1976 | Basile | 43/124 |
| 4,625,474 A | | 12/1986 | Peacock et al. | 43/124 |
| 4,630,392 A | | 12/1986 | Ferraro | 43/131 |
| 4,858,375 A | | 8/1989 | Mountain | 43/124 |
| 5,005,416 A | | 4/1991 | Vick et al. | 43/121 |
| 5,329,726 A | | 7/1994 | Thorne et al. | 43/124 |
| 5,378,086 A | | 1/1995 | Campbell, Jr. et al. | 43/124 |
| 5,390,440 A | * | 2/1995 | Mihealsick | 43/124 |
| 5,555,672 A | | 9/1996 | Thorne et al. | 43/124 |
| 5,571,967 A | | 11/1996 | Tanaka et al. | 73/587 |
| 5,575,105 A | | 11/1996 | Otomo | 43/132.1 |
| 5,592,774 A | | 1/1997 | Galyon | 43/124 |
| 5,678,362 A | | 10/1997 | Hulls et al. | 43/124 |
| 5,746,021 A | * | 5/1998 | Green | 43/131 |
| 5,778,596 A | * | 7/1998 | Henderson et al. | 43/132.1 |
| 5,802,779 A | | 9/1998 | Hulls et al. | 43/124 |
| 5,815,090 A | | 9/1998 | Su | 43/124 |
| 5,832,658 A | | 11/1998 | Randon | 43/131 |
| 5,877,422 A | | 3/1999 | Otomo | 73/587 |
| 5,899,018 A | | 5/1999 | Gordon et al. | 43/131 |
| 5,901,496 A | | 5/1999 | Woodruff | 43/124 |
| 5,921,018 A | | 7/1999 | Hirose et al. | 43/132.1 |
| 5,927,001 A | | 7/1999 | Ballard et al. | 43/131 |
| 5,937,571 A | | 8/1999 | Megargle et al. | 43/131 |
| 5,950,356 A | | 9/1999 | Nimocks | 43/131 |
| 5,953,855 A | | 9/1999 | Edwards | 43/132.1 |
| 6,003,266 A | * | 12/1999 | Woodruff | 43/124 |

(List continued on next page.)

Primary Examiner—Darren W. Ark
(74) Attorney, Agent, or Firm—Wood, Herron & Evans, L.L.P.

(57) ABSTRACT

A bait station facilitates monitoring of termite activity based on luring termites into the bait station and causing methane gas produced by termites to accumulate for periodic monitoring with a methane detector. The bait station includes an inverted T-shape pipe with subterranean apertures for entry of ground water, draining of fluids away from the bait station containing water soluble compounds that attract termites, and entry of termites into the bait station. An exposed access port of a container monitoring portion is selectively opened after each monitoring interval for detecting any accumulated methane gas with a detector. A system includes a portable methane detector to periodically monitor a deployed plurality of bait stations buried in a perimeter around a building structure. The bait stations lure termites away from the building and provide an indication of termite infestation.

18 Claims, 2 Drawing Sheets

U.S. PATENT DOCUMENTS

| | | | | |
|---|---|---|---|---|
| 6,014,834 A | * | 1/2000 | Ferland | 43/131 |
| 6,016,625 A | | 1/2000 | Bishoff et al. | 43/121 |
| 6,023,879 A | | 2/2000 | Katz et al. | 43/131 |
| 6,058,646 A | * | 5/2000 | Bishoff et al. | 43/131 |
| 6,079,150 A | * | 6/2000 | Setikas et al. | 43/132.1 |
| 6,100,805 A | * | 8/2000 | Lake | 43/132.1 |
| 6,149,928 A | * | 11/2000 | French | 43/131 |
| 6,178,834 B1 | * | 1/2001 | Cates | 73/865.8 |
| 6,187,328 B1 | * | 2/2001 | Ballard et al. | 43/131 |
| 6,195,934 B1 | * | 3/2001 | Megargle et al. | 43/131 |
| 6,202,342 B1 | * | 3/2001 | Edwards | 43/132.1 |
| 6,219,961 B1 | * | 4/2001 | Ballard et al. | 43/131 |
| 6,255,652 B1 | * | 7/2001 | Moyer | 250/343 |
| 6,266,918 B1 | * | 7/2001 | Henderson et al. | 43/131 |

* cited by examiner

SUBTERRANEAN TERMITE MONITOR AND METHOD

FIELD OF THE INVENTION

The invention is generally related to termite bait stations for monitoring and controlling subterranean termites and the associated method.

BACKGROUND OF THE INVENTION

It has long been known that termites can enter homes and other man-made building structures and cause serious damage. Moreover, it has been reported that termites, and especially subterranean termites, cause more damage to the wooden portions of building structures than any other insect. Preventing termite damage to building structures is critical to avoiding related expensive repairs and unsafe conditions.

Preventing termites from finding and colonizing in the wooden portions of building structures is often achieved by keeping water away from the wooden portions. Subterranean termites need moist living conditions to survive. The absence of water near the source of food for termites makes the wooden portions unattractive for colonizing.

Another benefit for keeping water away from the wooden portions is preventing subterranean termites from being lured by water-soluble components that attract termites. Water extracts water-soluble compounds from the wood. In addition, water encourages decomposition of the wood by fungi growth that also causes water-soluble compounds. If the wooden portions of the building structure are kept dry, the subterranean termites may then not find them.

Unfortunately, it is not always possible to prevent water from intruding into wooden portions of building structures. Factors such as climate, design of the building structure, state of repair, proximity of natural water sources, etc., create a possibility that at some point subterranean termites will find the wooden portions of the building structure.

Before the environmental and human impacts were appreciated, it was the practice to prevent wood-destroying insects from significantly damaging a building by adding persistent chlordane termiticides to the building and to the soil around the building. Such termiticides killed subterranean termites near or in the building for significant periods of time.

After these persistent termiticides were banned, the options available to prevent termite damage required a more frequent method for monitoring and responding to termite infestations. For example, available termiticides have a shorter period of effectiveness, and thus have to be repeatedly reapplied. Reapplication may be difficult or inappropriate since many wooden portions of a building are no longer readily accessible for treatment after the building is finished. Avoiding reapplication is often desired to reduce the cost, especially when no termite activity has been detected. Even if reapplied, termite infestation at or near the treated area is possible depending on how the treatment was performed and the environment affecting the treated area.

The disadvantages of only treating the building structure has led to use of bait stations for controlling termite activity by monitoring and/or killing termites. Typically, termite bait material such as piece of wood is placed within a container that is buried near a building. Water is allowed to enter the bait station and to extract water-soluble compounds from the wood. The water with the extracted compounds drains away from the bait station, luring subterranean termites to the bait station. The bait station also allows termites to enter therein. Different techniques are used to control termite activity in response to termites being lured into the bait station and detected.

Some bait stations require periodic visual inspection of the bait material for termite damage. Consequently, an elaborate means must be provided for removing the bait material from the station or for removing the entire bait station from the ground.

It is also generally known to use termiticide-impregnated wood as the bait material. Thus, the bait material not only lures the termites but also kills those that are lured into the bait station. This technique requires a significant economic expense of replacing termiticide lost into the soil or lost through decomposition due to exposure. However, it is also undesirable to unnecessarily dispense toxicants of any sort into the environment due to possible collateral damage to other plants and animals. Additionally, it is further possible that immunity will develop in the target populations after exposure to nonlethal doses.

Furthermore, use of termiticide-impregnated bait material may fail in the ultimate goal of protecting the adjacent building. Subterranean termites are random, opportunistic foragers that may find the adjacent building rather than a nearby bait station. Increasing the attractiveness of the bait station may be detrimental to protecting the building if the bait station then attracts termites from a larger radius than otherwise would. With this limitation in attractiveness, the bait station may be killing those termites that are lured into the bait station while other termites continue to damage the nearby building. No monitoring function is performed to alert a user that additional steps should be taken to protect the building structure with known systems.

Other techniques for controlling termite activity with a bait station do focus on monitoring termites at a bait station rather than merely killing termites. For instance, detection based on elevated methane gas levels produced by termites when digesting cellulose from wood materials is generally known. In one known system, a plurality of holes in an active bait station allow termites to enter. Termite activity changes the atmosphere within the active bait station and the atmospheric changes are registered by a permanently installed sensor. A computer system, wired to the active bait station, monitors the sensor, as well as sensors in other active bait stations and at least one control bait station. The control bait station is exposed to the same environment but is constructed so that termites cannot enter. Sensor readings significantly higher than the control station are deemed indicative of termite activity.

Once readings are at a level that indicates a termite colony, termiticides may be employed that use a slow-acting toxicant that tends to be shared amongst the termites, killing the entire the colony. Other termiticides use an insect growth regulator to disproportionately produce soldiers over workers to starve the colony. Consequently, the monitoring of termite activity results in a more effective solution, preventing the spread of termites by luring and killing an entire termite colony rather than just individual foraging termites.

While monitoring methane gas is effective in detecting the presence of termites, generally-known methane monitoring bait stations have a number of problems. The cost of each bait station is impacted by requiring a sensor for each station. The perimeter around a building may be large, requiring a large number of bait stations, and a corresponding large number of sensors. Moreover, the sensors are exposed to a humid environment within each bait station, degrading the reliability of the sensors. In addition, a complex system of wiring and data processing is necessary for monitoring the large number of sensors. Also, with the sensors and the interconnections between the sensors and the data processing subject to damage, monitoring may be subject to false alarms or failure to provide an alarm when warranted.

Consequently, a significant need exists for a more reliable, cost efficient, and effective subterranean termite monitoring device and method.

SUMMARY OF THE INVENTION

The invention addresses these and other problems associated with the prior art by providing an apparatus and method of monitoring termite activity near a building structure. In one particular embodiment of this invention, an environmentally safe bait material is used to lure subterranean termites to a bait station. Detecting methane gas produced by termites yields an effective and timely indication that use of a termiticide or other control measure is warranted. Due to the slow rate at which termites cause damage, a periodically used methane detector allows for a more reliable and economical way of monitoring subterranean termites.

In one embodiment of the invention, a bait station is in the form of a permeable container that is configured to hold bait material. Termites are able to access the bait material when the permeable container is buried. A container monitoring portion, in gaseous communication with the permeable container, is partially exposed above ground when the permeable container is buried. An access port is selectively closed to inhibit the escape of gases contained in the container through the access port. Consequently, methane gas accumulates if termites are present in the bait station and can be detected by a methane detector which is periodically inserted through the access port. Reliability of the methane detector is thus enhanced by limiting its exposure to the elements.

In another aspect consistent with the invention, a system for detecting subterranean termites proximate to a building structure uses a plurality of the bait stations substantially buried around a perimeter, increasing the likelihood that a foraging subterranean termite will encounter a bait station rather than the building structure. Each bait station is individually and periodically checked for methane gas levels with a methane gas detector, providing further economic savings by having one sensor for the plurality of bait stations. Moreover, a single methane gas detector may be used at other locations and with a plurality of bait stations, thereby yielding additional cost savings. Also, the system does not require wiring or other physical connection between the bait stations that would be damaged by gardening or trenching near the bait stations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
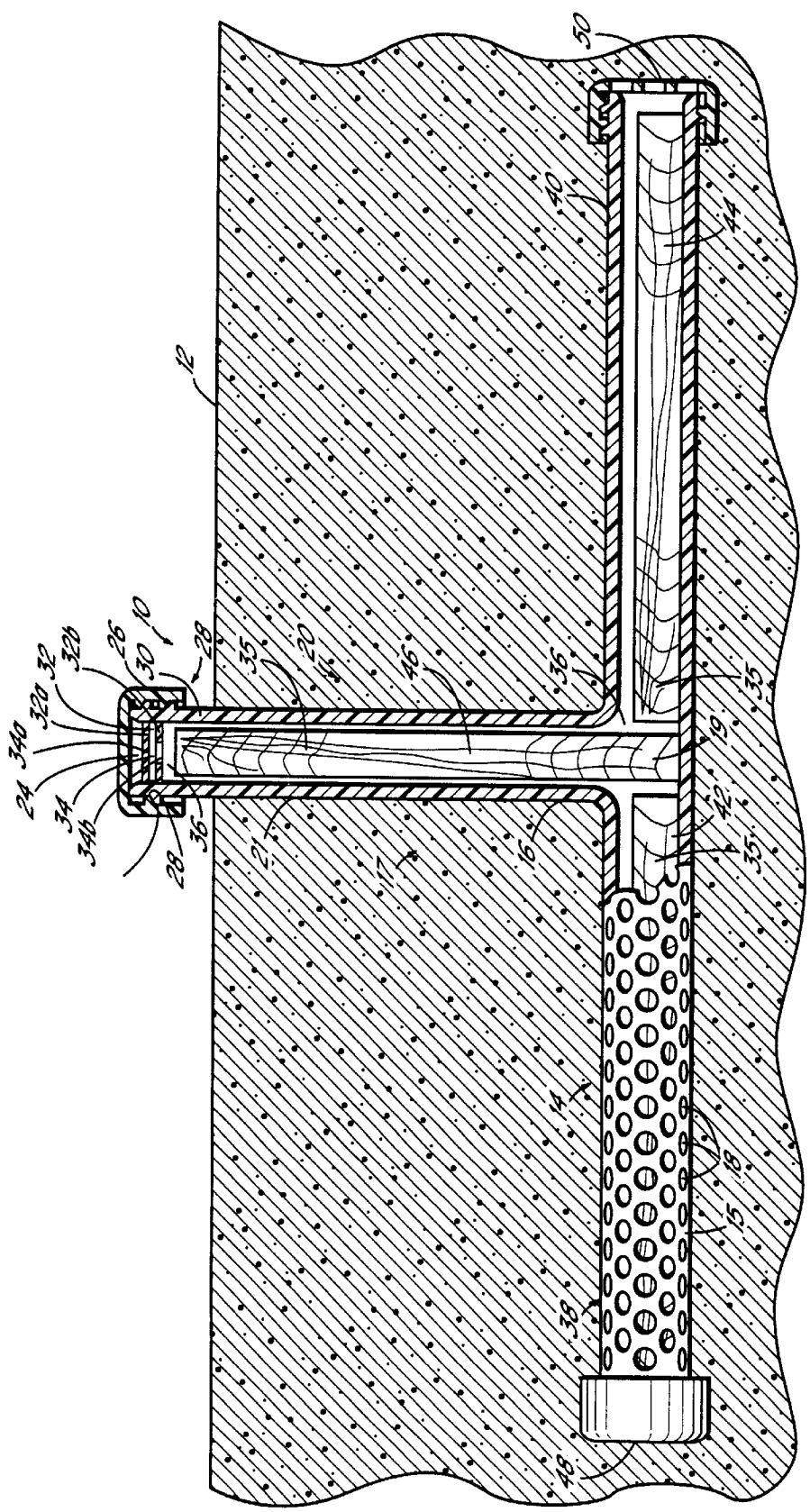
FIG. 1 is a partial cross-sectional side view of a subterranean bait station consistent with aspects of the invention.

Turning to the Drawings, wherein like numbers denote like parts throughout the several views, FIG. 1 depicts, consistent with aspects of the invention, a partial cross-sectional side view of a bait station 10 substantially buried in soil 12. The bait station 10 includes a fully-buried permeable container 14, illustrated by horizontal tubular pipe 15 and a lower portion 16 of a vertical tubular pipe 17, each perforated by a plurality of apertures 18. A lower end 19 of the vertical tubular pipe 17 is perpendicularly coupled midway on the horizontal tubular pipe 15, advantageously creating a bait station 10 that has an inverted T-shape.

The size of each aperture 18 is selected for allowing ground water to enter and drain from the permeable container 14 as well as allowing subterranean termites to enter. Generally, the number and size of the apertures 18 is not so large as to tend to weaken the horizontal and vertical tubular pipes 15, 17 to the point of failure or to allow excessive entry of soil 12 into the permeable container 14.

A container monitoring portion 20 is an upper portion 21 of the vertical tubular pipe 17 that is in gaseous communication with both the permeable container 14 and an exposed, above ground access port 22, depicted as an open end 24 of the vertical tubular pipe 17.

The open end 24 of the container monitoring portion 20 is selectively sealed with a closure, illustrated by a pipe cap 26 whose female threads 28 selectively engage male threads 30 on the open end 24 of the portion 20. When the pipe cap 26 is installed, the access port 22 is sealed.

Across the inner diameter of the open end 24, a diaphragm 32 provides additional gas sealing of the access port 22. For example, a diaphragm 32 of resilient material may include an expandable opening 34 that allows the insertion of a pointed object into the methane gas accumulation vessel without allowing the substantial escape of methane gas, as will be described below with reference to FIG. 3. In particular, a diaphragm 32 includes two closely spaced, parallel elastic disks 32a, 32b across the internal diameter of the open end 24 of the container monitoring portion 20, near the access port 22. The expandable opening 34 is formed by a first slit 34a across the diameter of one of the two elastic disks 32a and a second slit 34b, perpendicular to the first slit 34a, across the diameter of the other elastic disk 32b.

The additional sealing features of the diaphragm 32 advantageously allow a larger access port 22, allowing larger pieces of bait material 35 to be inserted or removed from the bait station 10, especially the vertical tubular pipe 17. Also, in dry soils, the larger access port 22 readily allows adding liquids into the bait station 10. The liquids may themselves comprise the bait material 35 by including termite attracting water-soluble compounds or interact with the bait material 35 to create such compounds. Even in moist soils, it may be advantageous to add water after burying the bait station 10 to hasten the process of causing termite attracting compounds to drain from the bait station 10.

It should be appreciated that a diaphragm 32 or a pipe cap 26 alone may provide adequate closure depending on the application. Moreover, in some instances considerations such as aesthetics may dictate relatively small, unobtrusive upper portions 21 and/or access ports 22 that allow various other types of closures to be used.

A methane gas accumulation vessel 36 is formed by the combination of the permeable container 14 and the container monitoring portion 20. The methane gas accumulation vessel 36 is substantially sealed to contain methane gas by a combination of burying the permeable container, selectively installing the pipe cap 26 and the presence of the diaphragm 32. The soil 12 adjacent to apertures 18 in the permeable container 14 tends to seal in gases when the bait station 10 is substantially buried. The pipe cap 26 seals the container monitoring portion 20 between periodic monitoring and the diaphragm 32 substantially seals the container monitoring portion 20 during periodic monitoring.

Apertures 18 depicted on the permeable container 14 may be varied in accordance to the application. For example, the amount of the upper portion 21 of the vertical tubular pipe 17 that is not perforated provides variability in how deeply the horizontal tubular pipe 15 may be buried and how high above ground the access port 22 may be placed. Also, the density of apertures 18 may be varied to alter the amount of water drainage in certain directions away from the bait station 10. For example, it may be preferable to increase drainage away from the outermost portions of the horizontal tubular pipe 15, as will be described in more detail below.

Within a left arm 38 and right arm 40 of the horizontal tubular pipe 15 of the permeable container 14, additional bait material 35, such as pieces of wood 42, 44 are respectively placed. Placing pieces of wood 42, 44 in horizontal arms 38, 40 allows for bait material 35 to be exposed to ground water that would tend to find the lowest parts of the bait station 10. Also, the depth at which horizontal arms 38, 40 are buried may be a predetermined depth such as about 10 inches (25.4 cm). This depth advantageously coincides with a depth likely to attract subterranean termites. The width of the permeable container 14 of the bait station 10 may be various dimensions. A dimension of about 24 inches (61 cm) is illustrative of a width that is convenient for handling and avoids excessive lengths that may tend to fracture due to uneven load bearing down on the permeable container 14 after being buried.

It will be appreciated that various shapes of bait stations 10 may be used consistent with aspects of the invention. The illustrative bait station 10 having an inverted T-shape has desirable features. For example, the vertical tubular pipe 17 of the container monitoring portion 20 provides the necessary access for above-ground monitoring, and additionally may facilitate introducing additional bait material 35 into the bait station 10, illustrated by a vertical piece of wood 46 in the container monitoring portion 20. It also facilitates protecting an entire building, as described below with regard to FIG. 2.

Two threadably engaged end caps 48, 50 close outer ends respectively of arms 38, 40, advantageously allowing insertion of pieces 42, 44. Alternatively, the bait material 35 in the horizontal arms 38, 40 may be inserted through the access port 22 or be permanently sealed within the bait station during manufacture. The end caps 48, 50 are advantageously perforated to enhance attracting subterranean termites to each side of the bait station, as will be better appreciated during the description below with regard to FIG. 2.

Various types of bait material 35 may be used consistent with aspects of the invention, such as yellow or white pine, corrugated cardboard, or other sources of cellulose material. Generally, the bait material 35 should have a coarseness that prevents compacting to the point where methane gas may no longer reach the access port 22.

An advantageous feature of the illustrative bait station 10 is that the vertical piece of wood 46 may initially not be present in the bait station 10, or be nontoxic bait material 35.

Upon detection of termite activity in the bait station 10 indicative that a termite colony has been formed, a piece of wood 46 impregnated with termiticide may be inserted into the bait station 10 to kill the entire termite colony. Waiting until the entire termite colony is lured to the bait station 10 enhances the effectiveness of the bait station 10, as well as avoiding unnecessary use of termiticide.

The bait station 10 may be fabricated from various materials, especially those resistant to deterioration due to weather and sunlight. Rigid plastic, especially those used for buried drain pipes, may provide strength to resist breaking. A singularly fabricated T-shape as depicted may alternatively be formed from discrete pieces joined with a pipe T-connector. In addition, flexible materials may be substituted consistent with aspects of the invention, especially when using bait material 38 that prevents portions of the flexible material from collapsing upon itself, blocking gaseous communication with the open end 24.

Figure 2:
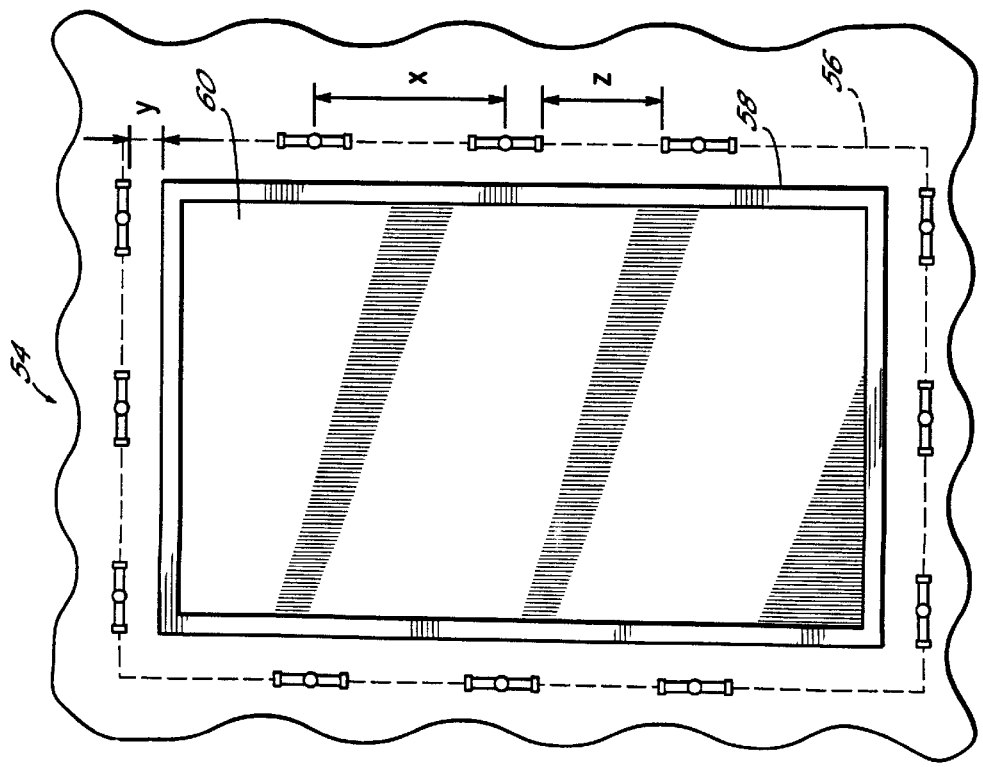
FIG. 2 is an overhead plan view of a termite monitoring system consistent with aspects of the invention including a plurality of the bait stations of FIG. 1.

With reference to FIG. 2, a plurality of bait stations 54 is installed at intervals (X), such as about 10 feet (3 m), along a perimeter 56 having an outer spacing (Y) from a foundation 58 of a building structure 60. The dimension of the intervals (X) in combination with the width of each bait station 10 results in a separation (Z), such as 8 feet (2.4 m) between adjacent bait stations 10. The horizontal dimension of each bait station 10 is aligned along the perimeter 56 to enhance coverage. The inverted T-shape of the illustrative bait station 10 allows the plurality of bait stations 54 to be readily installed after trenching around the foundation 58.

The separation (Z) between adjacent bait stations 10 is a predetermined value based on the effective subterranean termite luring capacity of each bait station 10. Various factors dictate this luring capacity such as the type of bait material, the types of indigenous subterranean termites, the amount of ground water or fluid added to each bait station, temperature, soil type, etc. Apertures 18 in the end caps 48, 50 tend to allow greater separation (Z) by encouraging drainage between stations 10. Moreover, trenching between stations 10 along the perimeter 56 may further encourage drainage along the perimeter 56, allowing further separation (Z).

The perimeter 56 has an outer spacing (Y) from the foundation 58 of about 18 inches (45.7 cm), being sufficiently proximate to detect termites near the foundation 58 without directing termites to the foundation 58. Moreover, the soil 12 immediate to the foundation may be drier given diversions of rainfall by the building structure 60, limiting activation of the bait station 10 by adjacent ground water.

Figure 3:
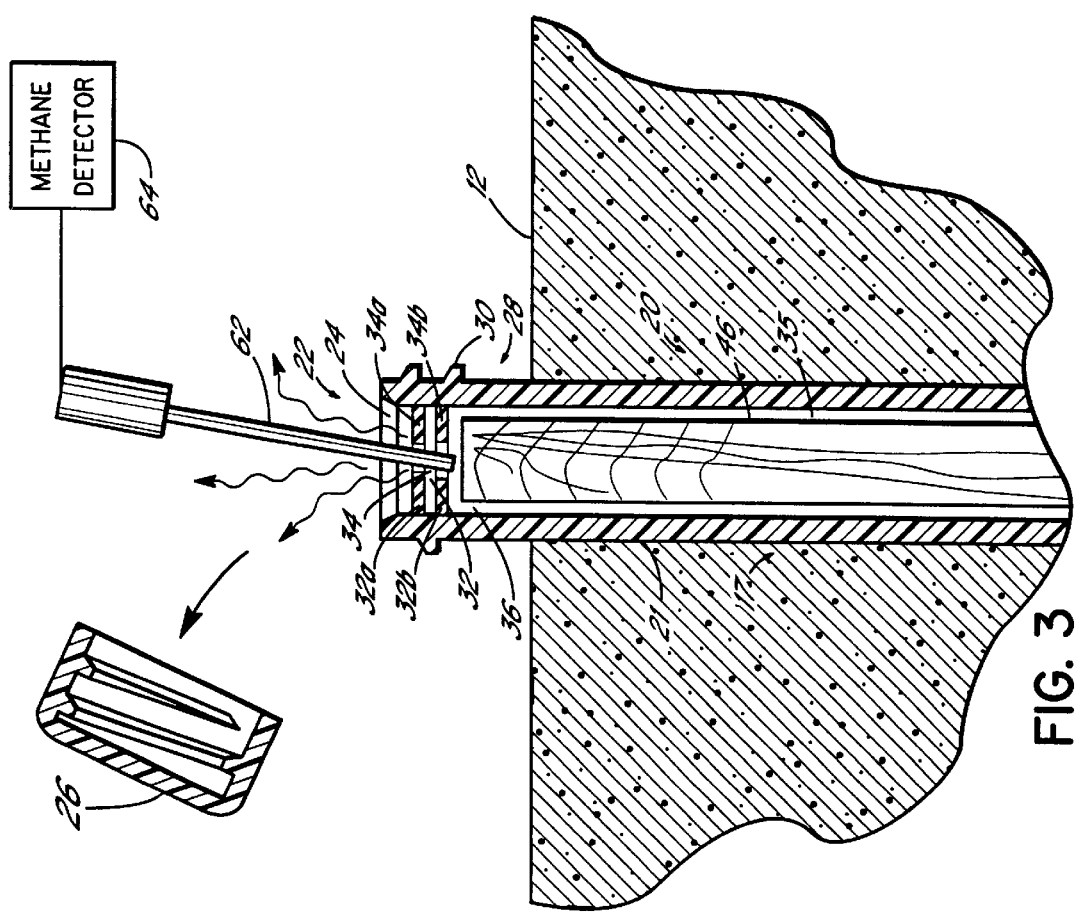
FIG. 3 is a cross-sectional side view of a methane detector being inserted into an access port of the bait station of FIG. 1.

With reference to FIG. 3, a probe 62 of a methane detector 64 is depicted being inserted through the opening 34 in the diaphragm 32 into the methane gas accumulation vessel 36 of a bait station 10 after removal of the pipe cap 26. Typically, a monitoring interval has elapsed since either the bait station 10 was buried or the last monitoring with the methane detector 64, allowing any termite activity to result in methane gas accumulation. The monitoring interval may also be selected for cost and convenience considerations since the rate of damage to termite infestation is generally slow. The selected monitoring interval may also reflect seasonal variations in the activity of the indigenous subterranean termites.

Using one methane detector 64 at intervals allows for the methane detector 64 to be protected from damage between monitoring. The sensing probe 62 of the detector 64 need only be briefly exposed to potentially damaging conditions. In addition, one methane detector 64 may monitor a large number of bait stations 10 in one or more perimeters 56.

A portable methane detector 64 used by a trained individual has advantages in preventing false alarms or failures to detect termite activity. Depending on the soil conditions, various amounts of methane may be naturally present in the soil due to activities other than by termites. A trained individual monitoring the methane detector readings can vary a threshold determination of what methane gas levels warrant remedial actions.

Although a portable methane detector 64 is shown in FIG. 3, this invention encompasses a methane detector which is inserted into the bait station 10 permanently. For example, the detector 64 may comprise a chemically treated article such as a piece of paper or substrate which is inserted through the opening 34 and access port 22 and sealed within the station 10. The paper or substrate detector 64 is treated or prepared to react to the presence of methane in the station 10 to change color or provide another visual indication of methane in the station 10. As such, when the cap 26 is removed at the end of a monitoring interval, a user visually inspects the detector 64 in the station 10 for a color change or the like. Periodically, the detector 64 may need to be replaced.

An optional feature of the invention includes using an identification marking, such as a bar code, on each bait station 10, preferably on an above-ground portion such as the cap 26. The operator would then scan the bar code (not shown) of each bait station with a bar code reader (not shown) in combination with using the detector 64 to monitor the station 10 for methane. As such, a record of each bait station 10, the monitored methane level and inspection time/date is recorded for transfer to a computer or other system for tracking the methane levels and consistency of methane sampling by the operator.

In summary, a bait station 10 is opened for insertion of bait material 35. In particular, at least one of the end caps 48, 50 is removed so that horizontal pieces of wood 42, 44 may be inserted into the permeable container 14. The bait station 10 is then lowered into a trench or hole and covered with soil 12 so that the bait station 10 is substantially buried, leaving exposed the open end 24 of the container monitoring portion 20, especially an access port 22. The bait material 35 is allowed to lure subterranean termites by either having the bait material 35 include fluid, allowing ground water to pass into and out of the permeable container 14 through a plurality of apertures 18, or adding water to the bait station 10. The access port 22 is sealed with a closure such as a pipe cap 26, forming a methane gas accumulation vessel 36 that captures methane gas produced by any termites that enter through the apertures 18. After a monitoring interval passes, the cap 26 is removed, and the probe 62 of a methane detector 64 is inserted into the access port 22 and through the opening 34 of the diaphragm 32 (if present) into the methane gas accumulation vessel 36. In response to reading an elevated methane gas level indicative of termite activity, a remedial termite control action is taken, such as inserting a termiticide-impregnated piece of wood 46 into the container monitoring portion 20, killing the termite colony that caused the methane gas level. The installation and monitoring may be extended to a plurality of bait stations 54 placed in intervals around the perimeter 56 of a building structure 60.

Other modifications will be apparent to one of ordinary skill in the art. Therefore, the invention lies in the claims hereinafter appended.

What is claimed is:

1. A system for detecting subterranean termites and adapted to be buried below ground level proximate a perimeter of a building structure, the system comprising:
    a plurality of bait stations adapted to be substantially buried around said perimeter of said building structure;
    wherein each of the bait stations comprises:
        (i) a permeable container configured to hold a bait material, the permeable container including a plurality of apertures for access to the bait material by said termites when the permeable container is buried;
        (ii) a container monitoring portion in gaseous communication with the permeable container, the container monitoring portion including an access port positioned above ground when the permeable container is buried, the access port configured for insertion of a methane detector; and
        (iii) a closure adapted to selectively seal the access port and inhibit the escape of gases contained in the container through the access port;
        wherein the permeable container, container monitoring portion, and closure form a methane gas containing vessel when the permeable container is buried, the methane gas generated by the termite consumption of said bait material to be detected by said methane detector and thereby monitor the presence of termites in the bait station; and
    a methane detector to be inserted into the access port of each bait station to monitor the presence of termites therein.

2. The system of claim 1, wherein the permeable container comprises a horizontal component and a vertical component, the container monitoring portion at an upper portion of the vertical component.

3. The system of claim 2, wherein a lower end of the vertical component perpendicularly couples to the horizontal component at about a midpoint of the horizontal component thereby forming an inverted T-shape.

4. The system of claim 2, wherein the permeable container comprises a tubular pipe perforated by the plurality of apertures.

5. The system of claim 4, wherein the closure comprises a pipe cap threadably secured to the upper portion of the vertical component to removably seal the access port.

6. The system of claim 2, wherein the horizontal component of each of the plurality of bait stations is adapted to be buried to a depth of about 10 inches below the ground level.

7. The system of claim 2, wherein the building structure is supported by a foundation, and wherein the horizontal component of each of the plurality of bait stations is substantially parallel to said foundation when the plurality of bait stations are substantially buried around said perimeter of said building structure.

8. The system of claim 1, further comprising:
    a diaphragm in the container to inhibit the passage of gas through the access port when the closure is removed from the container.

9. The system of claim 1, wherein each of the plurality of bait stations are adapted to be placed at about 8 foot intervals.

10. A system for detecting subterranean termites, the system adapted to be used proximate a perimeter of a building structure, wherein said building structure is supported by a foundation, and wherein the perimeter is defined proximate to said foundation, the system comprising:
    a plurality of bait stations adapted to be substantially buried around said perimeter of said building structure;
    wherein each of the bait stations comprises:
        (i) a permeable container configured to hold a bait material, the permeable container including a plurality of apertures for access to the bait material by said termites when the permeable container is buried;

(ii) a container monitoring portion in gaseous communication with the permeable container, the container monitoring portion including an access port positioned above ground when the permeable container is buried, the access port configured for insertion of a methane detector; and (iii) a closure adapted to selectively seat the access port and inhibit the escape of gases contained in the container through the access port;

wherein the permeable container, container monitoring portion, and closure form a methane gas containing vessel when the permeable container is buried, the methane gas generated by the termite consumption of said bait material to be detected by said methane detector and thereby monitor the presence of termites in the bait station; and a methane detector adapted to be inserted into the access port of each bait station to monitor the presence of termites therein.

11. The system of claim 10, wherein the bait stations are adapted to be positioned about 18 inches from said foundation.

12. A system for detecting subterranean termites and adapted to be buried below ground level proximate a perimeter of a building structure supported by a foundation, the system comprising:

a plurality of bait stations adapted to be substantially buried to a depth of about 10 inches in parallel relation around said perimeter proximate to said foundation of said building structure, each of the plurality of bait stations spaced relative to each other;

wherein each of the bait stations comprises:

(a) a permeable container configured to hold a bait material, the permeable container comprising:
  (i) a horizontal tubular pipe;
  (ii) a vertical tubular pipe perpendicularly coupled to the horizontal tubular pipe at about a midpoint of the horizontal tubular pipe thereby forming an inverted T-shape; and
  (iii) a plurality of apertures in at least the horizontal tubular pipe for access to the bait material by said termites when the permeable container is buried;

(b) a container monitoring portion in gaseous communication with the permeable container, the container monitoring portion comprising an upper portion of the vertical tubular pipe and including an access port positioned above ground when the permeable container is buried, the access port configured for insertion of a methane detector; and (c) a closure adapted to selectively seal the access port and inhibit the escape of gases contained in the permeable container through the access port, the closure including at least one of a pipe cap threadably engaging the access port and a diaphragm spanning an inner diameter of the access port;

wherein the permeable container, container monitoring portion, and closure form a methane gas containing vessel when the permeable container is buried, the methane gas generated by the termite consumption of said bait material to be detected by said methane detector and thereby monitor the presence of termites in the bait station; and a methane detector to be selectively inserted into the access port of each bait station to monitor the presence of termites therein.

13. A method for monitoring subterranean termites with a bait station, the method comprising:

placing bait material within a permeable container of the bait station;

burying the permeable container of the bait station, leaving exposed an access port of the bait station, the access port in gaseous communication with the permeable container;

closing the access port to inhibit the escape of gases contained in the container through the access port;

opening the access port at the completion of a monitoring interval; and inserting a methane detector in to the access port to detect methane gas generated by termite consumption of said bait material and thereby monitor the presence of termites in the bait station.

14. The method of claim 13, wherein inserting the methane detector in to the access port includes inserting a sensing portion of the methane detector through a diaphragm substantially sealing the access port.

15. The method of claim 13, wherein the placing, burying, closing, opening and inserting steps are accomplished for a plurality of bait stations, the method further comprising:

spacing the bait stations about a perimeter of a building structure.

16. The method of claim 15, further comprising:

opening the access port and adding fluid to the permeable container in response to the bait material being dry.

17. The method of claim 15, further comprising:

opening the access port and adding bait material to the bait station in response to depletion of termite luring compounds in the bait material.

18. A method for monitoring subterranean termites, the method comprising:

placing bait material within a permeable container of each of a plurality of bait stations;

burying in spaced relation each permeable container of the plurality of bait stations about a perimeter of a building structure, leaving exposed an access port of each bait station, the access port being in gaseous communication with the respective permeable container;

closing the access port to inhibit the escape of gases contained in the permeable container through the access port;

periodically monitoring the plurality of bait stations for the presence of termites by performing the following for each respective bait station:
  (i) opening the access port at the completion of a monitoring interval;
  (ii) inserting a methane detector in to the access port through a diaphragm in the permeable container that substantially seals the access port; and
  (iii) detecting methane gas in the permeable container with the methane detector, the methane gas generated by termite consumption of said bait material and thereby monitor the presence of termites in the bait station.

* * * * *